US012282286B2

(12) United States Patent
Uehara et al.

(10) Patent No.: US 12,282,286 B2
(45) Date of Patent: Apr. 22, 2025

(54) IMAGE FORMING APPARATUS INCLUDING FIXING DEVICE HAVING SHUTTER AND LOCK MEMBER FOR HOLDING SHUTTER POSITION

(71) Applicant: KYOCERA Document Solutions Inc., Osaka (JP)

(72) Inventors: Masakazu Uehara, Osaka (JP); Tomohiro Watatani, Osaka (JP); Takuya Kawasumi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/473,586

(22) Filed: Sep. 25, 2023

(65) Prior Publication Data

US 2024/0111243 A1 Apr. 4, 2024

(30) Foreign Application Priority Data

Sep. 29, 2022 (JP) ................................. 2022-156481
Apr. 27, 2023 (JP) ................................. 2023-073849

(51) Int. Cl.

*G03G 15/20* (2006.01)
*G03G 21/16* (2006.01)
*G03G 21/18* (2006.01)

(52) U.S. Cl.

CPC ..... *G03G 21/1647* (2013.01); *G03G 15/2017* (2013.01); *G03G 21/1685* (2013.01); *G03G 21/1842* (2013.01)

(58) Field of Classification Search

CPC ........... G03G 15/2017; G03G 15/2028; G03G 15/657; G03G 21/1647; G03G 21/1685; G03G 21/1842; G03G 21/1853; G03G 2215/00413; G03G 2221/1884
USPC .......................................... 399/111, 122, 400
See application file for complete search history.

(56) References Cited

U.S. PATENT DOCUMENTS

| | | | | |
|---|---|---|---|---|
| 10,509,361 | B2 | 12/2019 | Wada et al. | |
| 12,044,992 | B2 * | 7/2024 | Minoshima ........ | G03G 15/2028 |
| 12,072,649 | B2 * | 8/2024 | Ikeno ................ | G03G 15/2032 |
| 12,078,953 | B2 * | 9/2024 | Toyota ............... | G03G 15/2017 |

(Continued)

FOREIGN PATENT DOCUMENTS

| | | | | |
|---|---|---|---|---|
| JP | 2019095643 A * | 6/2019 | ......... | G03G 15/2017 |
| JP | 2019101165 A | 6/2019 | | |

*Primary Examiner* — Robert B Beatty
(74) *Attorney, Agent, or Firm* — Studebaker Brackett PLLC

(57) ABSTRACT

An image forming apparatus includes a fixing device, a shutter, a lock member and an attachment member. The fixing device is supported by an apparatus main body. The shutter is movable to a close position and to an open position. The lock member is movable to a holding position holding the shutter to the close position and an allowable position allowing the shutter to move from the close position to the open position. The lock member is moved to the holding position to hold the shutter to the close position in a state where the attachment member is detached from the apparatus main body. In the middle of attaching the attachment member to the apparatus main body, the attachment member moves the lock member from the holding position to the allowable position and then moves the shutter from the close position to the open position.

9 Claims, 9 Drawing Sheets

(56) References Cited

U.S. PATENT DOCUMENTS

| | | | | |
|---|---|---|---|---|
| 2015/0063868 | A1* | 3/2015 | Fukuda | G03G 15/2028 399/122 |
| 2019/0163121 | A1 | 5/2019 | Wada et al. | |
| 2021/0389692 | A1* | 12/2021 | Oguni | G03G 15/70 |
| 2022/0066382 | A1* | 3/2022 | Johnson, Jr. | G03G 21/1647 |

* cited by examiner

IMAGE FORMING APPARATUS INCLUDING FIXING DEVICE HAVING SHUTTER AND LOCK MEMBER FOR HOLDING SHUTTER POSITION

INCORPORATION BY REFERENCE

This application is based on and claims the benefit of priority from Japanese patent applications No. 2022-156481 filed on Sep. 29, 2022 and No. 2023-073849, filed on Apr. 27, 2023, which is incorporated by reference in its entirety.

BACKGROUND

The present disclosure relates to an image forming apparatus including a fixing device provided with a shutter for a heating rotating body.

The fixing device may be provided with a shutter that can be moved between a close position where the heating rotating body is covered and an open position where the heating rotating body is exposed and allows a sheet to be conveyed. When the inside of the device body is opened, such as during maintenance of the image forming device, the shutter is moved to the close position so that the user does not touch the heating rotating body. On the other hand, during the fixing operation, the shutter is moved to the open position.

An image forming apparatus may be configured to include a cartridge detachably attached to the apparatus body, and the shutter is moved from the close position to the open position when the cartridge is attached to the apparatus body.

In the image forming apparatus described above, in a state where the cartridge is detached, the shutter can be moved from the close position to the open position, and there is a possibility of inadvertent movement of the shutter to the open position. In addition, the shutter has an abutment part to which the cartridge abuts, which complicates the structure of the shutter. Furthermore, since the abutment part is located outside the heating rotating body in the axial direction of the heating rotating body, there is a problem that the fixing device becomes larger in size.

SUMMARY

An image forming apparatus according to the present disclosure includes a fixing device, a shutter, a lock member and an attachment member. The fixing device is supported by an apparatus main body and includes a heating rotating body by which a toner image is fixed on a sheet. The shutter is movable to a close position covering the heating rotating body and to an open position exposing the heating rotating body. The lock member is movable to a holding position holding the shutter to the close position and an allowable position allowing the shutter to move from the close position to the open position. The attachment member is detachably attached to the apparatus main body. The lock member is moved to the holding position to hold the shutter to the close position in a state where the attachment member is detached from the apparatus main body. In the middle of attaching the attachment member to the apparatus main body, the attachment member moves the lock member from the holding position to the allowable position and then moves the shutter from the close position to the open position.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereafter, an n image forming apparatus according to one embodiment of the present disclosure will be described with reference to the drawings.

Figure 1:
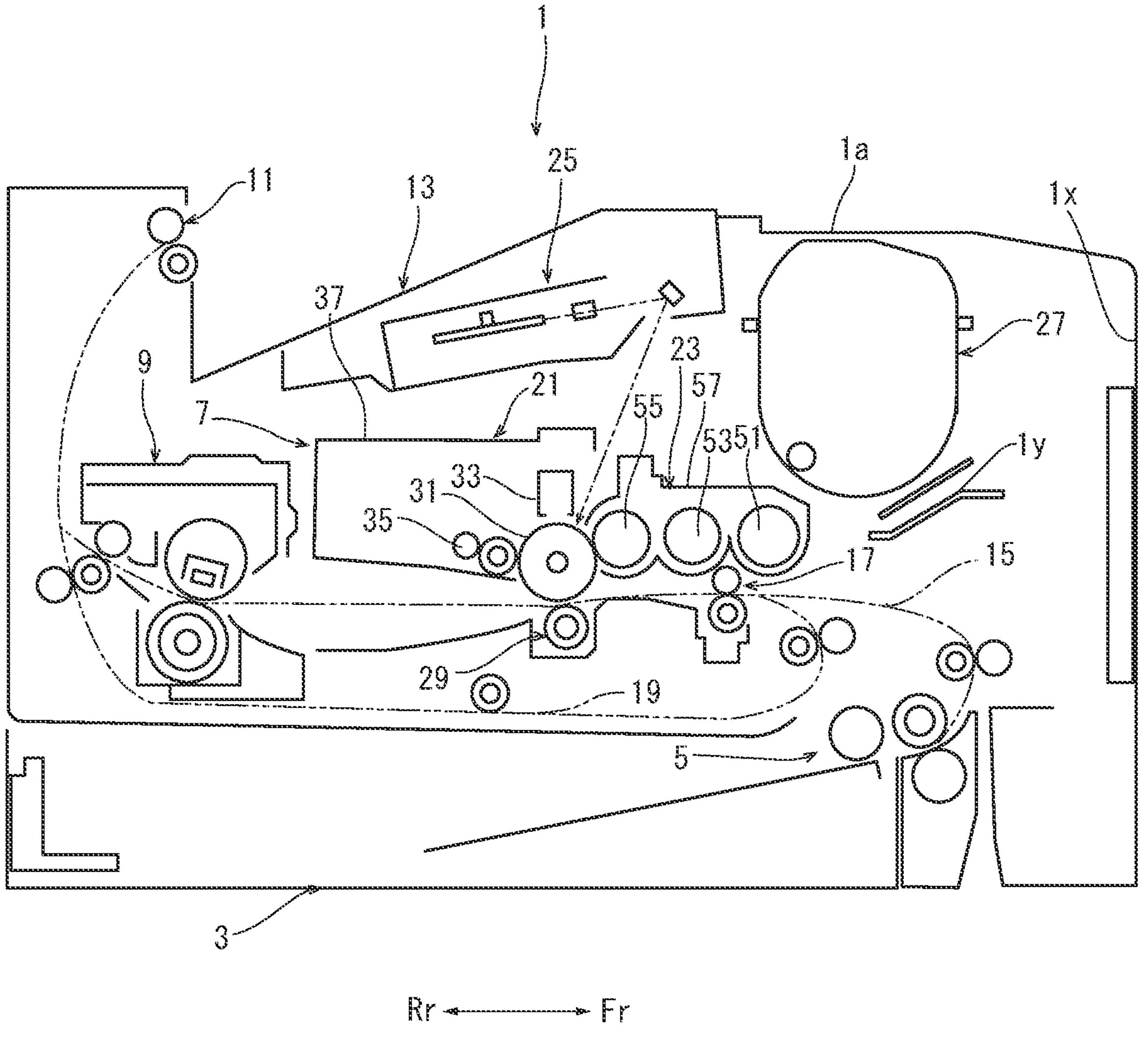
FIG. 1 is a front view schematically showing an inner structure of an image forming apparatus according to one embodiment of the present disclosure.

First, with reference to FIG. 1, the entire structure of the image forming apparatus 1 will be described. FIG. 1 is a front view schematically showing the internal structure of the image forming apparatus 1. The marks U, D, Fr, Rr, L and R attached to the following drawings indicate the upper, lower, front, rear, left and right, respectively.

The apparatus main body 1*a* of the image forming apparatus 1 includes a sheet feeding cassette 3 in which a sheet is stored, a sheet feeding device 5 which feeds the sheet from the sheet feeding cassette 3, an image forming part 7 which forms a toner image on the sheet in an electrophotographic method, a fixing device 9 which fixes the toner image on the sheet, a sheet discharge device 11 which discharges the sheet, and a sheet discharge tray 13 on which the discharged sheet is stacked. Further, a conveyance path 15 is formed in the apparatus main body 1*a*, along which the sheet is conveyed in the conveyance direction from the sheet feeding device 5 to the sheet discharge device 11 via the image forming part 7 and the fixing device 9. In the conveyance path 15, a registration rollers pair 17 is arranged between the sheet feeding device 5 and the image forming part 7. Further, the conveyance path 15 is branched to an inversion path 19 on the downstream side of the fixing device 9 in the conveyance direction. The inversion path 19 is merged with the conveyance path 15 on the upstream side of the registration rollers pair 17 in the conveyance direction.

Next, an image forming operation will be briefly described. The sheet fed from the sheet feeding cassette 3 by the sheet feeding device 5 is conveyed along the conveyance path 15, and after the skew is adjusted by the registration rollers pair 17, a toner image is formed on the sheet in the image forming part 7. The sheet on which the toner image is formed is conveyed along the conveyance path 15 to the fixing device 9, in which the toner image is fixed on the sheet. The sheet on which the toner image is fixed is discharged to the sheet discharge tray 13 by the sheet discharge device 11. In the case of duplex printing, the sheet with the toner image fixed on one side is conveyed from the conveyance path 15 through the inversion path 19 to the conveyance path 15 again. After the sheet is conveyed along the conveyance path 15 and the skew is adjusted by the registration rollers pair 17, a toner image is formed on the other side of the sheet in the image forming part 7. The sheet on which the toner image is formed is conveyed along the conveyance path 15 to the fixing device 9, in which the toner image is fixed on the sheet. The sheet on which the toner image is fixed is discharged to the sheet discharge tray 13 by the sheet discharge device 11.

Next, the image forming part 7 will be described with reference to FIG. 1. The image forming part 7 includes a drum unit 21, a developing unit 23, an exposure device 25, a toner container 27, and a transfer roller 29. The drum unit 21, the developing unit 23 and the toner container 27 are detachably attached to the apparatus main body 1*a*. The exposure device 25 and the transfer roller 29 are fixedly attached to the apparatus main body 1*a*.

Figure 2:
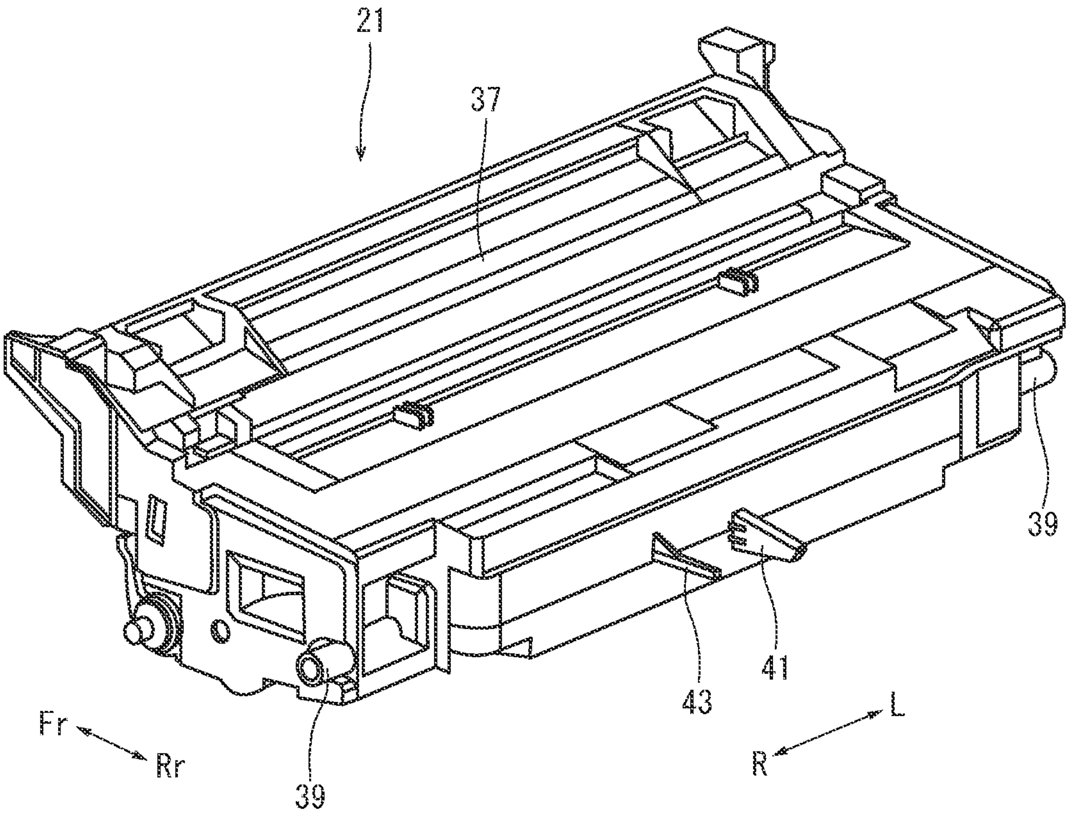
FIG. 2 is a perspective view showing a drum unit, in the image forming apparatus according to the embodiment of the present disclosure.

The drum unit 21 will be described with reference to FIG. 1 and FIG. 2. FIG. 2 is a perspective view showing the drum unit 21. The drum unit 21, as shown in FIG. 1, includes a photosensitive drum 31, a charging device 33, a cleaning device 35, and a drum housing 37 by which they are supported. The photosensitive drum 31 is rotatably supported on the drum housing 37. A part of the outer circumferential surface of the photosensitive drum 31 is exposed through an opening formed in the drum housing 37. The charging device 33 and the cleaning device 35 are arranged around the photosensitive drum 31 along the direction of rotation of the photosensitive drum 31.

The drum unit 21 is detachably attached at a predetermined position on the upstream side of the fixing device 9 in the conveyance direction through an opening 1*x* of the apparatus main body 1*a*. More specifically, as shown in FIG. 1, rails 1*y* toward the predetermined position are formed on the left and right side plates of the apparatus main body 1*a*. As shown in FIG. 2, guide pins 39 are provided on the left and right side plates of the drum housing 37. These guide pins 39 are engaged with the rails 1*y* and moved along the rails 1*y* so that the drum unit 21 is positioned at the predetermined position. The drum unit 21 is an example of an attaching member detachably attached to the apparatus main body 1*a* in the present disclosure.

As shown in FIG. 2, the drum housing 37 is provided with an opening/closing protrusion 41 and a releasing protrusion 43. The two protrusions 41, 43 are protruded from the rear surface of the drum housing 37 (the downstream surface in the conveyance direction) toward the rear side (the downstream side in the attaching direction), that is, toward the fixing device 9. The two protrusions 41 and 43 are arranged with a prescribed interval in the left-and-right direction. The two protrusions 41 and 43 each has a nearly triangular plate-like shape when viewed from the left-and-right directions and has a similar length.

The developing unit 23, as shown in FIG. 1, includes an agitation roller 51, a supply roller 53, a developing roller 55, and a developing housing 57 by which they are supported and which houses a developer. The rollers 51, 53 and 55 are rotatably supported by the developing housing 57. A part of the outer circumferential surface of the developing roller 55 is exposed through an opening formed in the developing housing 57.

The developing unit 23 is detachably attached at a predetermined position on the upstream side of the drum unit 21 in the conveyance direction through the opening 1*x* of the apparatus main body 1*a*. Guide pins (not shown) are provided on the left and right side plates of the developing housing 57. These guide pins are engaged with the rails 1*y* and moved along the rails 1*y* so that the developing unit 23 is positioned at the predetermined position. When the developing unit 23 is positioned, a part of the outer circumferential surface of the developing roller 55 exposed from the opening of the developing housing 57 faces a part of the outer circumferential surface of the photosensitive drum 31 exposed from the opening of the drum housing 37 of the drum unit 21 at a predetermined interval.

The exposure device 25 is arranged above the drum unit 21 and the developing unit 23. The exposure device 25 emits laser light on the outer circumferential surface of the photosensitive drum 31 based on the image data to form an electrostatic latent image on the photosensitive drum 31.

The toner container 27 is arranged above the developing unit 23. The toner container 27 can communicate with the developing housing 57 of the developing unit 23, and supplies a toner to the developing housing 57.

The transfer roller 29 is arranged so as to face the photosensitive drum 31 exposed from the opening of the drum housing 37 of the drum unit 21 across the conveyance path 15. A transfer nip is formed between the transfer roller 29 and the photosensitive drum 31.

A toner image forming operation in the image forming part 7 will be described. In the drum unit 21, the photosensitive drum 31 is charged to a predetermined potential by the charging device 33. Then, by the exposure device 25, the photosensitive drum 31 is irradiated with laser light based on the image data, and an electrostatic latent image is formed on the photosensitive drum 31. In the developing unit 23, the toner supplied from the toner container 27 is agitated by the agitation roller 51 and charged by the developer contained in the developing housing 57, and the charged toner is supplied by the supply roller 53 to the developing roller 55 and held by the developing roller 55. The held toner is supplied to the electrostatic latent image formed on the photosensitive drum 31, and the electrostatic latent image is developed into the toner image. The toner image is transferred from the photosensitive drum 31 to the sheet at the transfer nip. The toner remaining on the photosensitive drum 31 is removed by the cleaning device 35.

Figure 3:
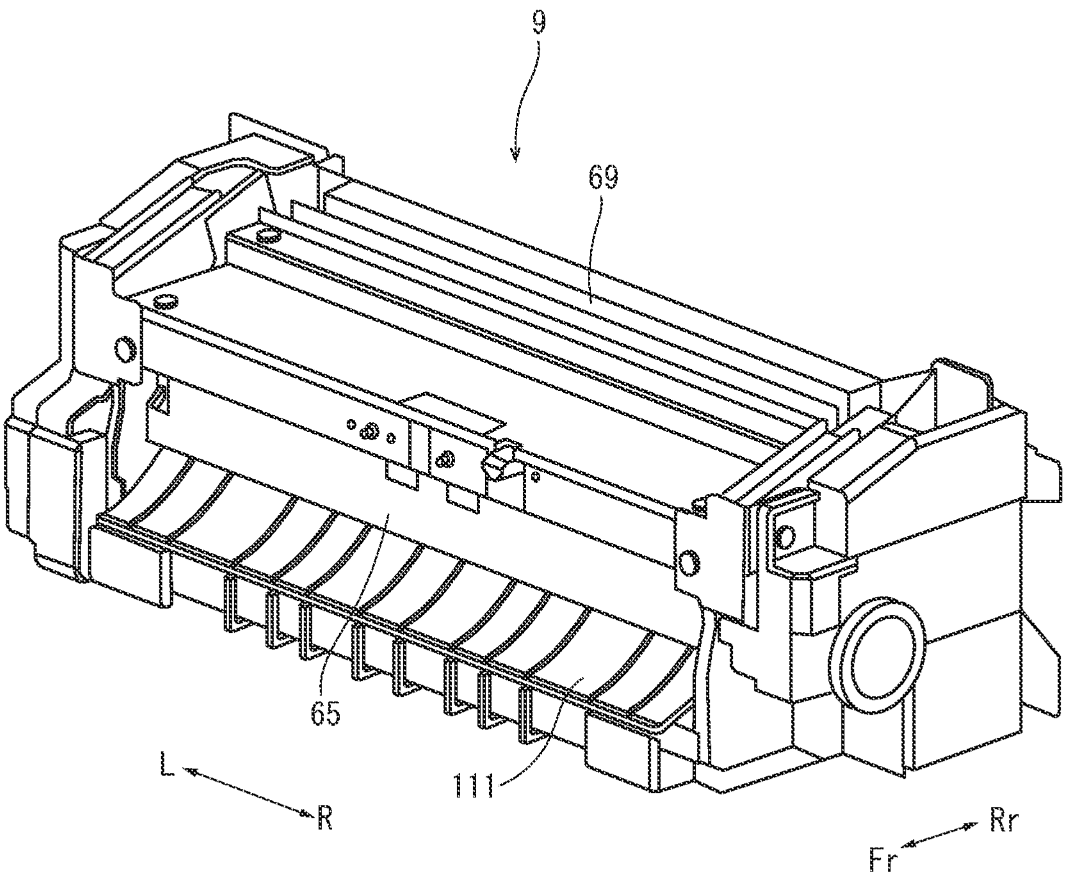
FIG. 3 is a perspective view showing a fixing device, in the image forming apparatus according to the embodiment of the present disclosure.

Next, the fixing device 9 will be described with reference to FIG. 3 and FIG. 4. FIG. 3 is a perspective view showing the fixing device 9, and FIG. 4 is a sectional view showing the fixing device 9.

Figure 4:
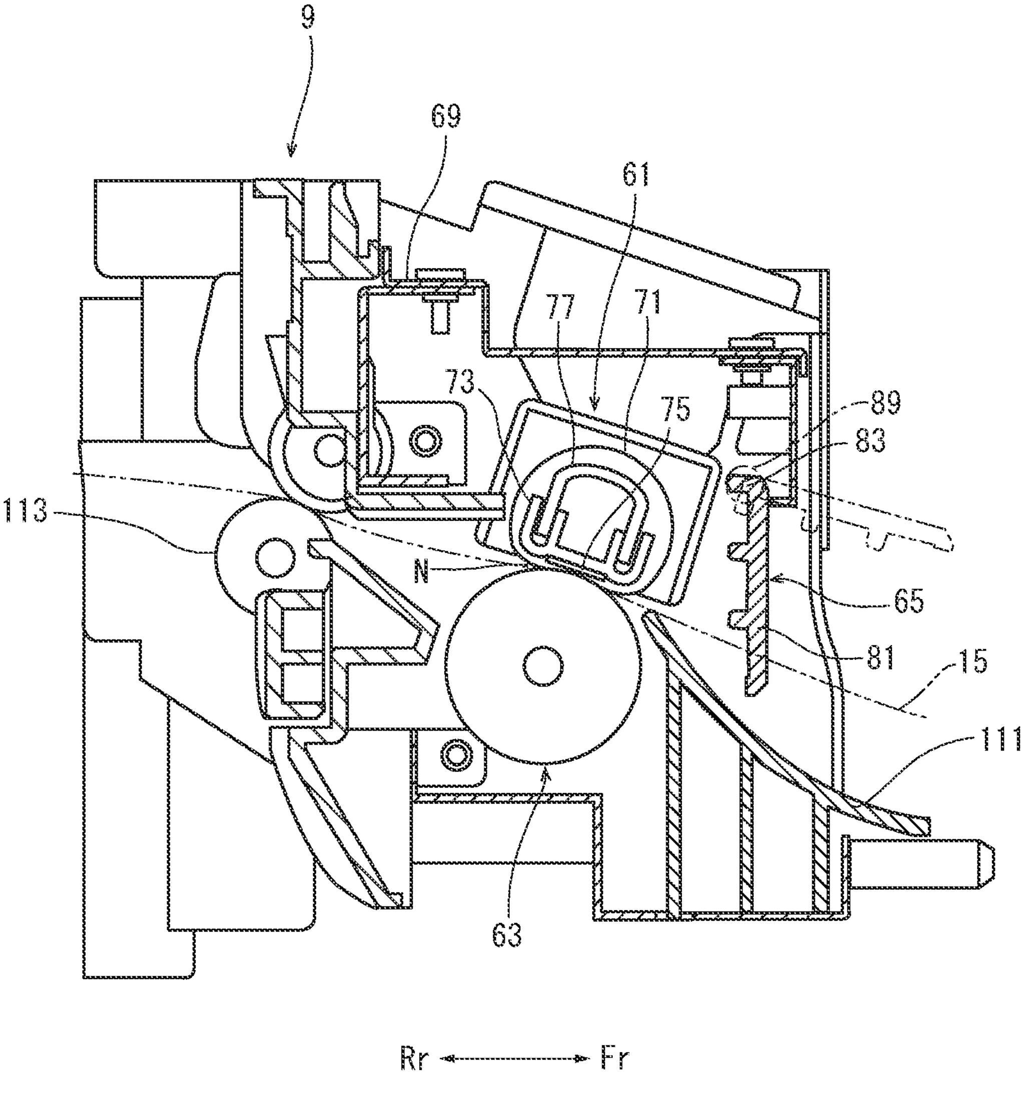
FIG. 4 is a sectional view showing the fixing device, in the image forming apparatus according to the embodiment of the present disclosure.

As shown in FIG. 4, the fixing device 9 includes a belt assembly 61, a pressure roller 63, a shutter 65, a lock member 67 (not shown in FIG. 3 and FIG. 4, described later with reference to FIG. 5 and FIG. 6), and a fixing housing 69 by which they are supported.

The belt assembly 61 includes a fixing belt 71, a support member 73 supporting the fixing belt 71, a heater 75 supported by the support member 73 to heat the fixing belt 71, and a pair of end holders (not shown) which supports the support member 73.

The fixing belt 71 is an endless belt having a predetermined inner diameter and a width longer than the width of the sheet. The fixing belt 71 is made of flexible material, and has a base layer, an elastic layer provided on the outer circumferential surface of the base layer, and a release layer provided on the outer circumferential surface of the elastic layer. The base layer is made of resin. The elastic layer is made of silicone rubber or the like. The release layer is made of a PFA tube or the like. The fixing belt 71 is an example of a heating rotating body of the present disclosure.

The support member 73 has a sliding surface facing the inner circumferential surface of the fixing belt 71. The sliding surface has a width wider than the width of the fixing belt 71, and is formed to be along the circumferential direction of the fixing belt 71. The support member 73 is supported by a stay 77 penetrating the hollow space of the fixing belt 71. Both ends of the stay 77 are secured to the end holders. The support member 73 is fixed on the lower surface of the stay 77, and the sliding surface faces the inner circumferential surface of the fixing belt 71. As described later, when the fixing belt 71 is rotated, the inner circumferential surface of the fixing belt 71 slides against the sliding surface of the support member 73, and the fixing belt 71 is guided along the circumferential direction. On the sliding surface, a groove is formed along the width direction.

The heater 75 is, for example, a plate-like ceramic heater that generates heat when energized. The heating area of the heater 75 is slightly wider than the width of the sheet. The heater 75 is housed in the groove formed on the sliding surface of the support member 73.

The pressure roller 63 has a rotating shaft, an elastic layer provided on the outer circumferential surface of the rotating shaft, and a release layer provided on the outer circumferential surface of the elastic layer.

The left and right ends of the rotating shaft of the pressure roller 63 are rotatably supported by the left and right side plates of the fixing housing 69. Both the end holders of the belt assembly 61 are rotatably supported on the left and right side plates of the fixing housing 69 above the pressure roller 63. As a result, a fixing nip N is formed between the pressure roller 63 and the fixing belt 71 that faces the heater 75 of the belt assembly 61. A driving gear is fixed to one end of the rotating shaft of the pressure roller 63. The driving gear is connected to a motor via a gear train.

When the motor is driven, the driving gear is rotated in the clockwise direction of FIG. 4 via the gear train. This rotation of the driving gear rotates the pressure roller 63 in one direction (in the counterclockwise direction in this example), and the fixing belt 71, which is in contact with the pressure roller 63 at the fixing nip N, is rotated in the other direction (in the clockwise direction in this example). Thus, the sheet guided to the fixing nip N passes through the fixing nip N. At this time, the toner image is heated and pressurized to be fixed on the sheet.

Figure 5:
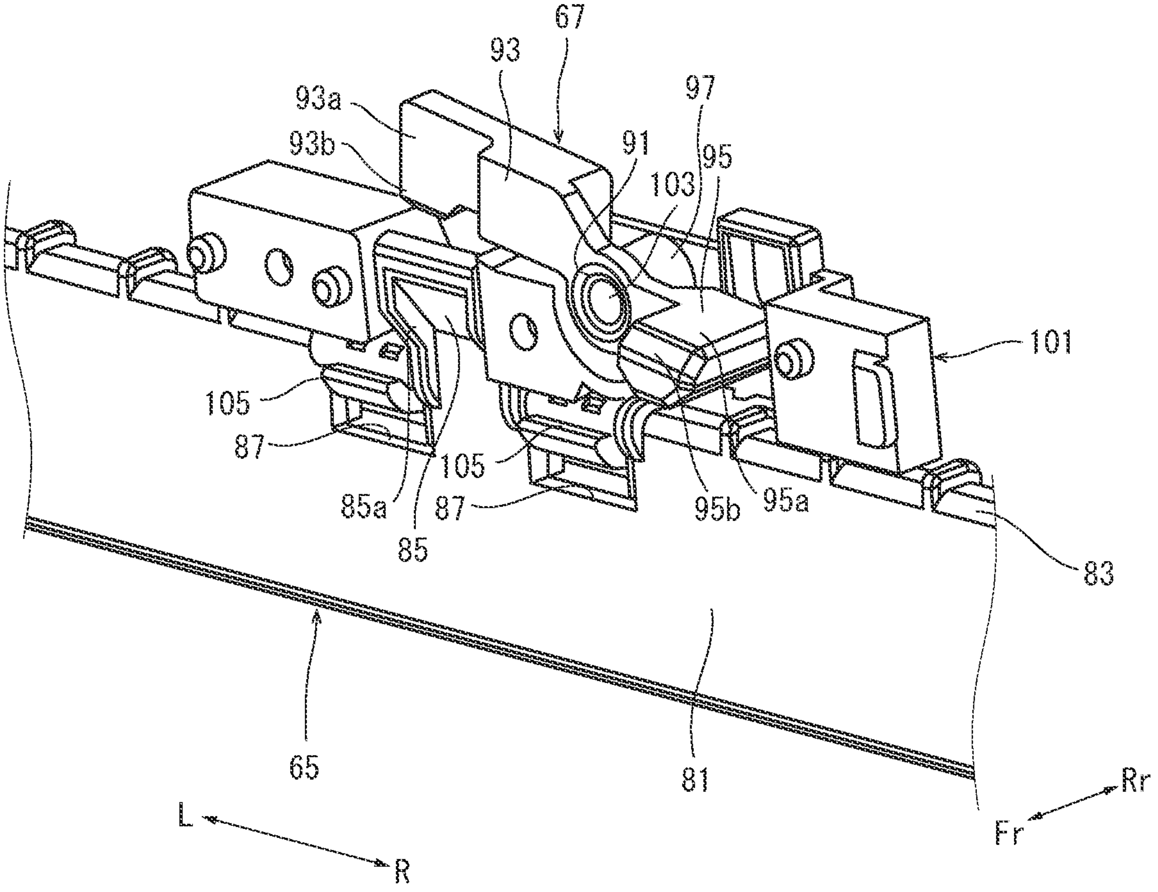
FIG. 5 is a perspective view showing a lock member turned to an allowable position, in the image forming apparatus according to the embodiment of the present disclosure.
Figure 6:
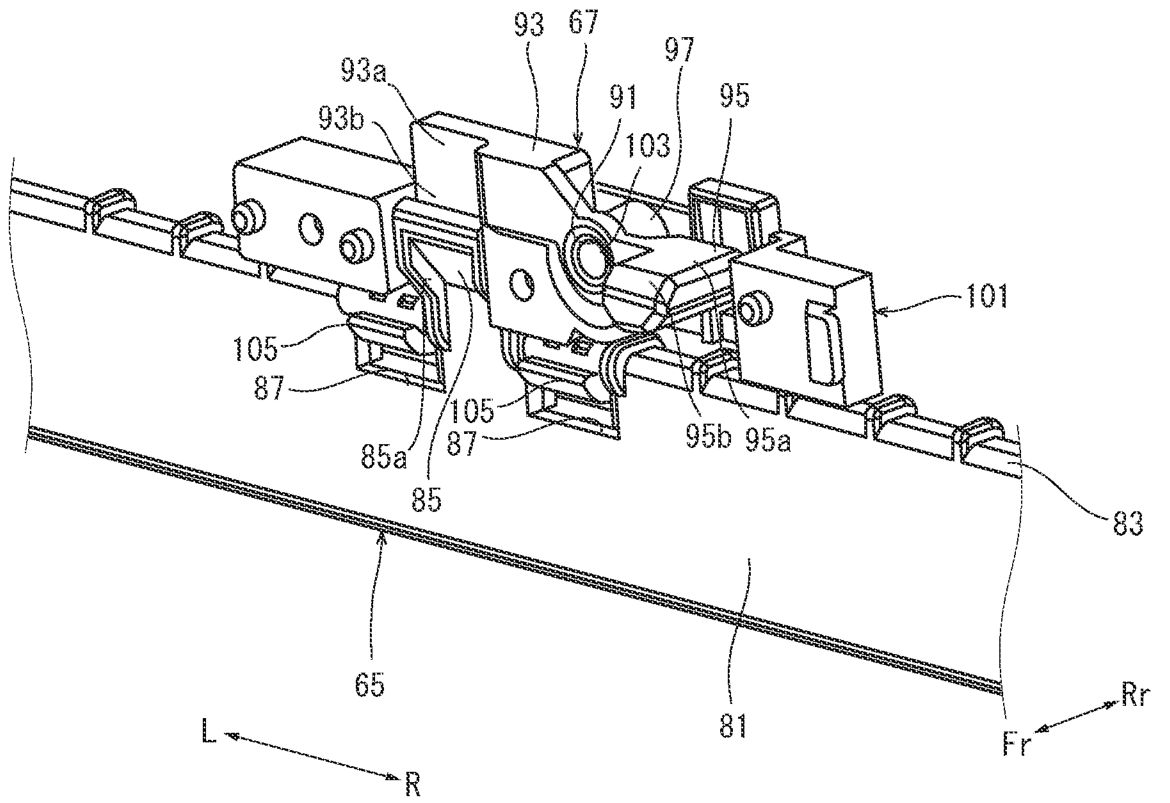
FIG. 6 is a perspective view showing the lock member turned to a holding position, in the image forming apparatus according to the embodiment of the present disclosure.

Next, the shutter 65 will be described with reference to FIG. 4, and FIG. 5 and FIG. 6. FIG. 5 and FIG. 6 are perspective views showing the shutter 65 and the lock member 67.

The shutter 65 is provided with a rectangular shutter piece 81 having a width equal to that of the fixing belt 71 and a predetermined height, and a rotating shaft 83 provided along the upper edge of the shutter piece 81. As shown in FIG. 5 and FIG. 6, a protrusion piece 85 protruding upward is formed in the center of the upper edge of the shutter piece 81. The protrusion piece 85 is inclined toward the upstream side (the side of the drum unit 21) in the conveyance direction with respect to the shutter piece 81. A rib 85*a* are formed along the side and upper edges of the protrusion piece 85. Furthermore, a rectangular opening 87 is formed in the shutter piece 81 below the rotating shaft 83 on both sides of the protrusion piece 85. The shutter piece 81 is also referred to simply as the shutter 65.

As shown in FIG. 4, the shutter 65 is arranged on the upstream side of the fixing nip N in the conveyance direction, and both ends of the rotating shaft 83 are rotatably supported on the left and right side plates of the fixing housing 69 above the fixing nip N. With this, the shutter piece 81 is rotated between a close position and an open position around the rotating shaft 83. In the close position (see the solid line in FIG. 3), the shutter piece 81 hangs downward from the rotating shaft 83 by its own weight to block the conveyance path 15, and covers the fixing belt 71 as seen from the upstream side (the side of the drum unit 21) in the conveyance direction. In the open position (see the two-dot chain line in FIG. 3), the shutter piece 81 is turned upstream in the conveyance direction around the rotating shaft 83 to open the conveyance path 15, and expose the fixing belt 71 as seen from the upstream side in the conveyance direction.

Next, the lock member 67 will be described with reference to FIG. 5 and FIG. 6. The lock member 67 is a member which makes in a seesaw motion around a rotating axis along a direction perpendicular to the conveyance direction, and has a through-hole 91 around the rotating axis, a lock piece 93 provided on one side of the through-hole 91, and an actuation piece 95 provided on the other side of the through-hole 91. The lock piece 93 has a plate-like shape with rectangular front and rear surfaces. The tip half 93*a* of the lock piece 93 opposite to the side of the through-hole 91 is formed to be thinner in the front-and-rear direction than the other half of the lock piece 93 on the side of the through-hole 91. The tip half 93*a* has an extension 93*b* extending downward. The actuation piece 95 has a plate-like shape with a rectangular flat upper surface 95*a* and a front surface 95*b* inclined downwardly toward the upstream side in the conveyance direction (the front side). The actuation piece 95 protrudes further upstream than the through-hole 91 and the lock piece 93 in the conveyance direction (forward) along the axial direction of the through-hole 91.

The lock member 67 is supported on the fixing housing 69 by a holder 101. The holder 101 has a rotating shaft 103 along the conveyance direction. The rotating shaft 103 is inserted into the through-hole 91 of the lock member 67. Thus, the lock member 67 makes a seesaw motion around the rotating shaft 103. The holder 101 is supported on the fixing housing 69 such that the lock piece 93 of the lock member 67 is positioned on the downstream side of the protrusion piece 85 of the shutter 65 in the conveyance direction (behind the protrusion piece 85 of the shutter 65). In the state where the lock member 67 is thus supported by the holder 101 on the fixing housing 69, the actuation piece 95 of the lock member 67 and the protrusion piece 85 of the shutter 65 face the releasing protrusion 43 and the opening/closing protrusion 41 of the drum housing 37, respectively. Furthermore, the actuation piece 95 protrudes further upstream (forward) than the protrusion piece 85 in the conveyance direction. That is, the front surface 95*b* of the actuation piece 95 is positioned more upstream in the conveyance direction than the front surface of the protrusion piece 85.

As described above, the lock member 67 makes a seesaw motion around the rotating shaft 103. As shown in FIG. 5, when the lock member 67 makes a seesaw motion such that the lock piece 93 is upward and the actuation piece 95 is downward, the lock piece 93 separates upward from the protrusion piece 85 of the shutter 65. As a result, the protrusion piece 85 can be rotated to the downstream side in the conveyance direction (the rear side), and the shutter 65 can be rotated from the close position to the open position. The position (posture) of the lock member 67 in this case is defined as an allowable position.

On the other hand, as shown in FIG. 6, when the lock member 67 makes a seesaw motion such that the lock piece 93 is downward and the actuation piece 95 is upward, the lock piece 93 and the protrusion piece 85 of the shutter 65 are overlapped with each other along the conveyance direction. In detail, the lock piece 93 is placed on the downstream side of the protrusion piece 85 in the conveyance direction (the rear side). Therefore, when the protrusion piece 85 attempts to rotate to the downstream side in the conveyance direction, the protrusion piece 85 (mainly the extension portion 93*b*) interferes with the lock piece 93, preventing the shutter piece 81 from rotating to the open position. The position (posture) of the lock member 67 in this case is defined as a holding position. The lock member 67 is biased by a torsion coil spring 97 to be rotated from the allowable position to the holding position.

The holder 101 has support pieces 105 that can be inserted into both the openings 87 of the shutter 65. With the support pieces 105 inserted into both the openings 87, the rotating shaft 83 of the shutter 65 is rotatably supported by these support pieces 105.

Furthermore, as shown in FIG. 4, the fixing housing 69 is provided with a guide member 111 and a conveyance rollers pair 113. The guide member 111 is arranged on the upstream side of the fixing nip N in the conveyance direction. The conveyance rollers pair 113 is arranged on the downstream side of the fixing nip N in the conveyance direction.

Figure 7:
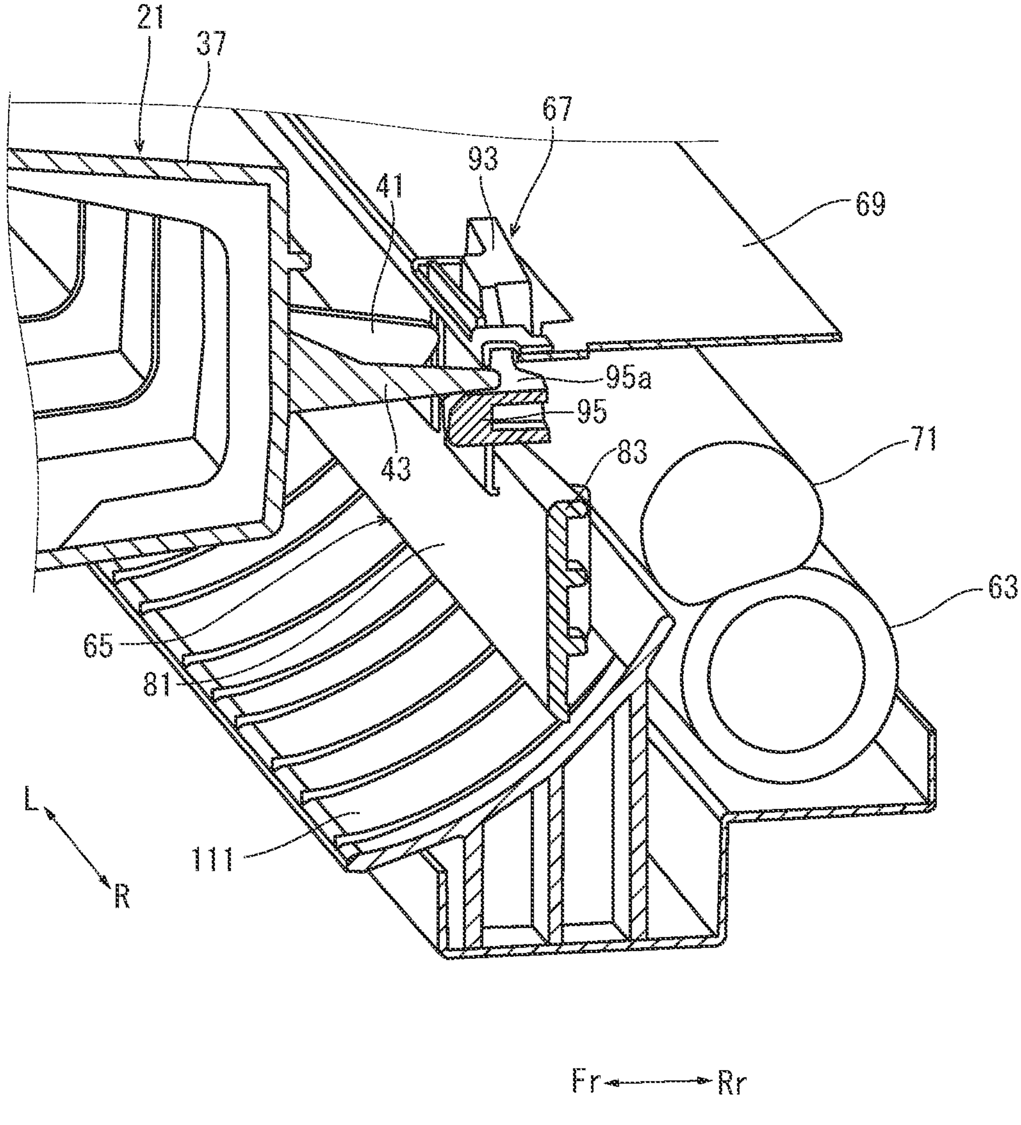
FIG. 7 is a sectional perspective view showing a shutter turned to a close position and the lock member turned to the allowable position by a releasing protrusion, in the image forming apparatus according to the embodiment of the present disclosure.
Figure 8:
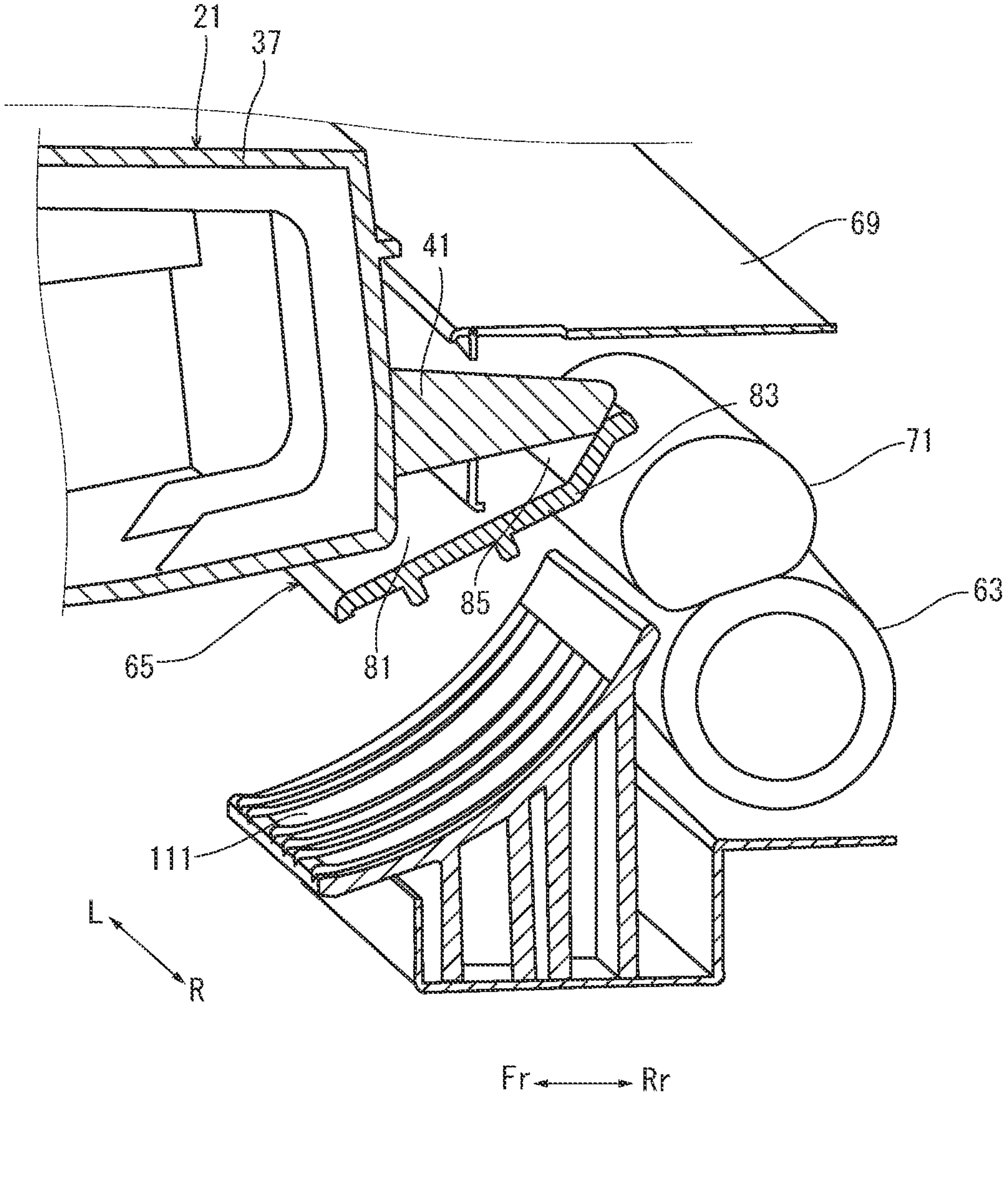
FIG. 8 is a sectional perspective view showing the shutter turned to an open position by an opening/closing protrusion, in the image forming apparatus according to the embodiment of the present disclosure.

In the image forming apparatus 1 having the above configuration, an opening and closing operation of the shutter 65 of the fixing device 9 will be described with reference to FIG. 7 and FIG. 8. FIG. 7 is a sectional perspective view showing the shutter 65 turned to the close position and the lock member 67 turned to the allowable position by the releasing protrusion 43, and FIG. 8 is a sectional perspective view showing the shutter 65 turned to the open position by the opening/closing protrusion 41.

In a state where the drum unit 21 and the developing unit 23 are detached from the apparatus main body 1*a*, the fixing device 9 is exposed through the opening 1*x* (see FIG. 1) of the apparatus main body 1*a*. However, the shutter 65 (the shutter piece 81) is turned to the close position to cover the fixing belt 71 (see also FIG. 4), thereby preventing the operator from accidentally touching the fixing belt 71. The lock member 67 is turned to the holding position by the torsion coil spring 97. Therefore, when the shutter piece 81 is to be turned to the open position, since the protrusion piece 86 of the shutter 65 interferes with the lock piece 93 of the lock member 67 (see FIG. 6), the turning of the shutter 65 to the open position is restricted.

From this state, the operator attaches the drum unit 21. The operator engages the guide pins 39 of the drum housing 37 of the drum unit 21 with the rails 1*y*, and moves it along the rails 1*y* toward the predetermined position. The drum unit 21 is moved toward the predetermined position, that is, a position on the upstream side of the fixing device 9 in the conveyance direction, with the opening/closing protrusion 41 and the releasing protrusion 43 forward. Then, first, the releasing protrusion 43 abuts on the front surface 95*b* of the actuation piece 95 of the lock member 67 of the fixing device 9. That is, because the front surface 95*b* of the actuation piece 95 of the lock member 67 is located on the upstream side of the front surface of the protrusion piece 85 of the shutter 65 in the conveyance direction, the releasing protrusion 43 abuts on the front surface 95*b* of the actuation piece 95 of the lock member 67 before the opening/closing protrusion 41 abuts on the front surface of the protrusion piece 85.

When the drum unit 21 is further moved toward the predetermined position, the releasing protrusion 43 moves from the front surface 95*b* of the actuation piece 95 to the upper surface 95*a*. Thus, the actuation piece 95 is pushed downward by the releasing protrusion 43. Then, as shown in FIG. 7, the lock member 67 makes a seesaw motion around the rotating shaft 103 against the biasing force of the torsion coil spring 97, and is turned from the holding position to the allowable position.

When the lock member 67 is turned to the allowable position, the lock piece 93 of the lock member 67 is separated upward from the protrusion piece 85 of the shutter 65 as described above.

When the drum unit 21 is further moved, the opening/closing protrusion 41 abuts on the front surface of the protrusion piece 85 of the shutter 65. When the drum unit 21 is further moved and then attached to the predetermined position, the opening/closing protrusion 41 pushes the protrusion piece 85 downstream in the conveyance direction. Since the rib 85*a* is formed along the side edge and the upper edge of the protrusion piece 85, the opening/closing protrusion 41 surely pushes the protrusion piece 85 without separating from the protrusion piece 85. Then, as shown in FIG. 8, the shutter piece 81 of the shutter 65 is turned from the close position to the open position around the rotating shaft 83. This opens the conveyance path 15. Then, the developing unit 23 is attached in the predetermined position, and then the image forming operation will be performed.

On the other hand, when the drum unit 21 is detached after the developing unit 23 is detached, the opening/closing protrusion 41 of the drum unit 21 first separates from the protrusion piece 85 of the shutter 65. That is, because the lock piece 93 of the lock member 67 is located on the upstream side of the actuation piece 95 in the conveyance direction 8 the front side), when the drum unit 21 is separated from the fixing device 9, the opening/closing protrusion 41 separates from the protrusion piece 85 before the releasing protrusion 43 separates from the actuation piece 95. Then, the shutter 65 is turned from the open position to the close position by its own weight. Then, the releasing protrusion 43 of the drum unit 21 separates from the actuation piece 95 of the lock member 67. Then, the lock member 67 is biased by the torsion coil spring 97, and turned to the holding position. Thus, the lock piece 93 of the lock member 67 overlaps the protrusion piece 85 of the shutter 65, and the turning of the shutter piece 81 to the open position is restricted.

As described above, according to the image forming apparatus of the present disclosure, the shutter 65 can be turned from the close position to the open position in accordance with the attachment action of the drum unit 21. In addition, it is provided with the lock member 67 to hold the shutter 65 in the close position. Therefore, the shutter 65 can be prevented from inadvertently turning from the close position to the open position, and the opening/closing operation of the shutter 65 can be simplified.

Furthermore, the shutter 65 is turned to the open position and the close position around the rotating shaft 83, and the lock member 67 makes a seesaw motion to the fixed position and the allowable position around the rotating shaft 103. With such rotational motions, the shutter 65 and the lock member 67 can be reliably moved to each position without failure, and the configuration of the shutter 65 and the lock member 67 can be simplified.

Furthermore, the shutter 65 is configured such that the protrusion piece 85 provided above the rotating shaft 83 is pushed in so that the shutter piece 81 provided below the rotating shaft 83 is turned. This makes it possible to shorten the amount of pushing the protrusion piece 85 to turn the shutter piece 81 to the open position and then to turn the shutter piece 81 smoothly. Furthermore, the protrusion piece 85 is inclined to the upstream side in the conveyance direction with respect to the shutter piece 81. As a result, when the drum unit 21 is attached, the shutter piece 81 can be surely turned to the open position where the conveyance path 15 can be sufficiently opened while the amount of pushing the protrusion piece 85 is shortened, and the shutter piece can be brought into contact with the opening/closing protrusion 41 provided in the drum housing 37 relatively quickly.

Furthermore, the shutter 65 and the lock member 67 are supported by the fixing housing 69 of the fixing device 9. Moreover, the opening/closing protrusion 41 and the releasing protrusion 43 are integrally provided on the drum housing 37 of the drum unit 21. As a result, the number of parts and assembly steps of the fixing device 9 and the drum unit 21 can be reduced.

In this embodiment, the shutter 65 may be provided with a biasing member 89 that biases the shutter piece 81 to the close position. The biasing member 89 is, for example, a torsion coil spring, and can be provided at one end of the rotating shaft 83 as shown in FIG. 4. In this case, the shutter 65 can be held in the close position even when the device stops in the state where the sheet is held in the fixing nip N. Therefore, even when the drum unit 21 is detached during the handling of the sheet jamming, the operator's fingers can be prevented from accidentally touching the fixing belt 71.

In this embodiment, in the close position of the shutter 65, the lock piece 93 of the lock member 67 is arranged behind the protrusion piece 85 of the shutter 65, but the lock member 67 may have two lock pieces arranged in front and behind the protrusion piece 85. In this case, in the close position of the shutter 65, the turning of the shutter 65 to both sides can be restricted, so that the safety can be further enhanced. Furthermore, the length of the releasing protrusion 43 may be longer than the length of the opening/closing protrusion 41.

In the present embodiment, an example of an attachment member detachably attached to the apparatus main body 1*a* is the drum unit 21, but it may be a cover that opens and closes the opening 1*x* of the apparatus main body 1*a*.

Figure 9:
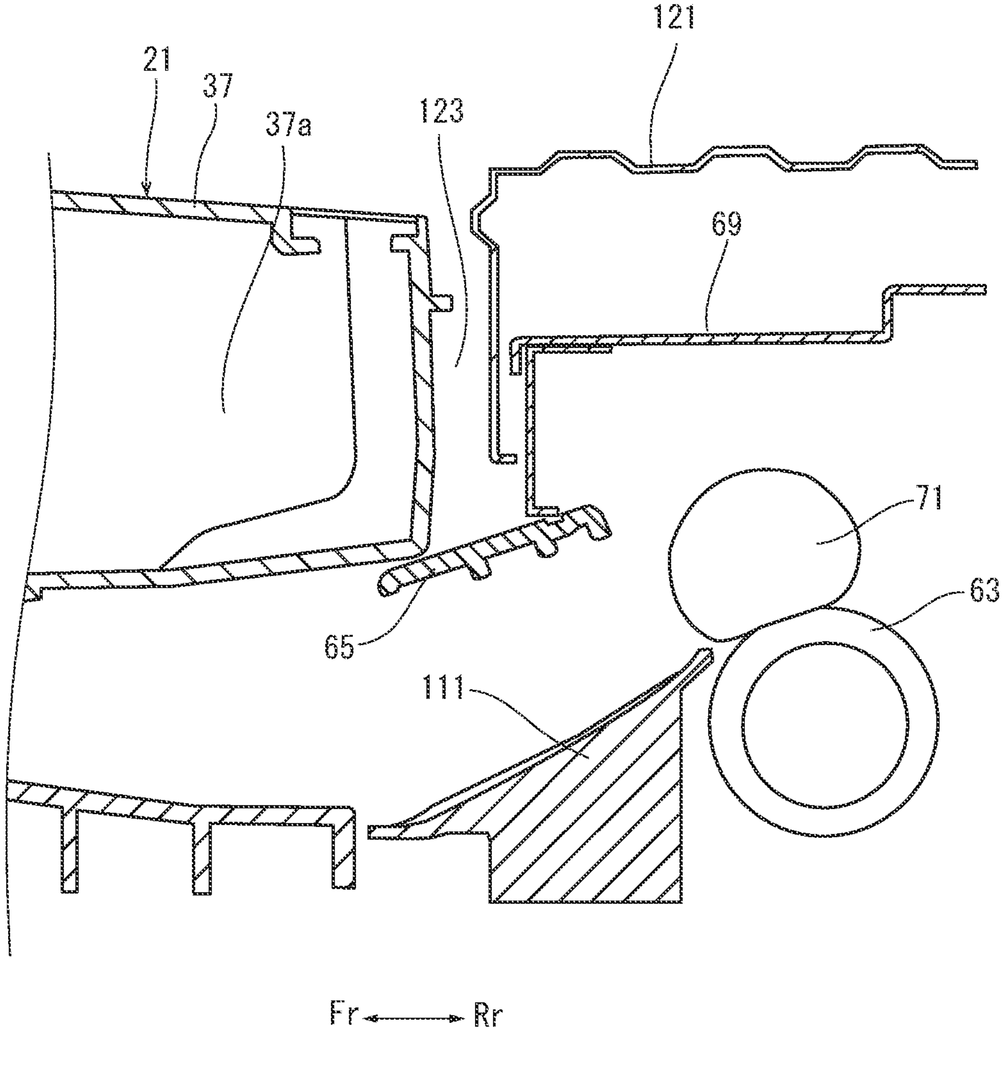
FIG. 9 is a sectional view showing the shutter turned to the open position by the opening/closing protrusion, the drum unit and a frame, in the image forming apparatus according to the embodiment of the present disclosure.

Also, as shown in FIG. 9, when the drum unit 21 is attached and the shutter 65 is turned to the open position, the tip of the shutter piece 81 is in close to the lower surface of the drum housing 37 of the drum unit 21. FIG. 9 is a sectional view showing the shutter 65 turned to the open position, the drum unit 21 and a frame 121.

When the drum unit 21 is attached and the shutter 65 is turned to the open position, a duct 123 is formed along the front-and-rear direction between the rear surface of the drum housing 37, the shutter 65 and the frame 121 separating the fixing device 9 from the drum unit 21. A branch duct (not shown) extending from a fan (not shown) is connected to one end of the duct 123. During the image forming operation, cooling air is supplied through the branch duct into the duct 123.

The passage of cooling air through the duct 123 cools the drum housing 37. In the rear portion of the drum housing 37, a waste toner recovery part 37*a* in which waste toner is stored is often provided. Since the cooling air passing through the duct 123 is in contact with the rear surface of the drum housing 37, the waste toner recovery part 37*a* provided in the rear portion of the drum housing 37 is particularly cooled. Therefore, the agglomeration of the waste toner recovered in the waste toner recovery part 37*a* can be prevented, and the waste toner can be recovered stably. A protrusion piece (not shown) may be formed in the frame 121 to block the upper surface of the duct 123.

Although the disclosure has been described for a specific embodiment, the disclosure is not limited to the above embodiment. A person skilled in the art can modify the above embodiment as long as it does not deviate from the scope and spirit of the disclosure.

The invention claimed is:

1. An image forming apparatus comprising:

a fixing device which is supported by an apparatus main body and includes a heating rotating body by which a toner image is fixed on a sheet;

a shutter movable to a close position covering the heating rotating body and to an open position exposing the heating rotating body;

a lock member movable to a holding position holding the shutter to the close position and an allowable position allowing the shutter to move from the close position to the open position; and an attachment member detachably attached to the apparatus main body, wherein the lock member is moved to the holding position to hold the shutter to the close position in a state where the attachment member is detached from the apparatus main body, in the middle of attaching the attachment member to the apparatus main body, the attachment member moves the lock member from the holding position to the allowable position and then moves the shutter from the close position to the open position, the shutter is turned around a turning shaft to the close position and the open position, the lock member makes a seesaw motion around a rotating axis to the holding position and to the allowable position and is biased to make a seesaw motion from the allowable position to the holding position, the attachment member has:

a releasing protrusion which causes the lock member to make a seesaw motion from the holding position to the allowable position against a biasing force of the biasing member; and an opening/closing protrusion which turns the shutter from the close position to the open position after the lock member makes a seesaw motion to the allowable position, the lock member has:

a lock piece restricting a turning of the shutter from the close position to the open position; and an actuation piece being pushed down by the releasing protrusion, and when the actuation piece is pushed down by the releasing protrusion, the lock member makes a seesaw motion around the rotating axis and the lock piece is separated from the shutter.

2. The image forming apparatus according to claim 1, wherein the shutter and the lock member are provided in the fixing device.

3. The image forming apparatus according to claim 1, comprising:

a biasing member biasing the shutter to be turned to the closing position.

4. The image forming apparatus according to claim 1, wherein the shutter has a protrusion piece which turns the shutter from the close position to the open position by being pushed by the opening/closing protrusion, and the protrusion piece is arranged above the turning shaft.

5. The image forming apparatus according to claim 4, wherein the protrusion piece is inclined to an upstream side in an attachment direction of the attachment member.

6. The image forming apparatus according to claim 1, wherein the attachment member is a drum unit including a photosensitive drum and a housing storing the photosensitive drum, and the releasing protrusion and the opening/closing protrusion are integrally provided in the housing.

7. An image forming apparatus comprising:

a fixing device which is supported by an apparatus main body and includes a heating rotating body by which a toner image is fixed on a sheet;

a shutter movable to a close position covering the heating rotating body and to an open position exposing the heating rotating body;

a lock member movable to a holding position holding the shutter to the close position and an allowable position allowing the shutter to move from the close position to the open position;

a drum unit including a photosensitive drum and a housing storing the photosensitive drum; and a frame provided between the drum unit and the fixing device, wherein the lock member is moved to the holding position to hold the shutter to the close position in a state where the drum unit is detached from the apparatus main body, in the middle of attaching the drum unit to the apparatus main body, the drum unit moves the lock member from the holding position to the allowable position and then moves the shutter from the close position to the open position, and when the drum unit is attached to the apparatus main body, a duct between the shutter, the drum unit and the frame is formed, through which cooling air is passed.

8. The image forming apparatus according to claim 7, wherein the shutter is turned around a turning shaft to the close position and the open position, the lock member makes a seesaw motion around a rotating axis to the holding position and to the allowable position and is biased to make a seesaw motion from the allowable position to the holding position, and the drum unit has:

a releasing protrusion which causes the lock member to make a seesaw motion from the holding position to the allowable position against a biasing force of the biasing member; and an opening/closing protrusion which turns the shutter from the close position to the open position after the lock member makes a seesaw motion to the allowable position.

9. An image forming apparatus according to claim 8, wherein the releasing protrusion and the opening/closing protrusion are integrally provided in the housing.

* * * * *